(12) United States Patent
Marx et al.

(10) Patent No.: US 6,874,532 B2
(45) Date of Patent: Apr. 5, 2005

(54) VALVE FOR A FUEL DELIVERY UNIT

(75) Inventors: Peter Marx, Wasbüttel (DE); Wilfried Möller, Ludwigsau (DE); Jürgen Schaffert, Bad Hersfeld (DE); Johannes Deichmann, Alheim-Sterkelshausen (DE); Jörg Deubner, Bebra (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 10/647,019

(22) Filed: Aug. 22, 2003

(65) Prior Publication Data

US 2004/0060601 A1 Apr. 1, 2004

Related U.S. Application Data

(62) Division of application No. 09/885,199, filed on Jun. 20, 2001, now Pat. No. 6,640,831.

(30) Foreign Application Priority Data

Jun. 21, 2000 (DE) .......................................... 100 30 609

(51) Int. Cl.[7] .............................................. F16K 15/04
(52) U.S. Cl. ................... 137/539; 137/543.17; 251/337
(58) Field of Search ................................ 137/199, 202, 137/517, 519.5, 533.17, 533.19, 539, 589

(56) References Cited

U.S. PATENT DOCUMENTS

| 701,754 | A | * | 6/1902 | Moran ........................ 137/509 |
|---|---|---|---|---|
| 2,916,042 | A | * | 12/1959 | Brady, Jr. .................... 137/202 |
| 3,421,547 | A | | 1/1969 | Aslan |
| 3,734,115 | A | * | 5/1973 | McMath ....................... 137/73 |
| 4,068,680 | A | * | 1/1978 | Sliger ....................... 137/512.1 |
| 4,079,717 | A | * | 3/1978 | Shirose ........................ 123/516 |
| 4,100,935 | A | * | 7/1978 | Harnish ................. 137/533.11 |
| 4,700,741 | A | | 10/1987 | Murphy |
| H438 | H | * | 3/1988 | Viksne et al. ............ 137/519.5 |
| 4,765,504 | A | * | 8/1988 | Sherwood et al. ......... 220/86.2 |
| 4,951,701 | A | * | 8/1990 | Boehmer ..................... 137/199 |
| 4,972,869 | A | * | 11/1990 | Takasaki ..................... 137/199 |
| 5,755,259 | A | | 5/1998 | Schulze et al. |
| 5,762,093 | A | * | 6/1998 | Whitley, II ................. 137/199 |
| 5,823,169 | A | * | 10/1998 | Strohl et al. ................ 123/516 |
| 6,439,506 | B1 | * | 8/2002 | Schlegel et al. ......... 244/135 R |

FOREIGN PATENT DOCUMENTS

| DE | 1 196 920 | | 7/1965 | |
|---|---|---|---|---|
| DE | 36 26 099 A1 | | 2/1987 | |
| DE | 40 14 551 C1 | * | 12/1991 | |
| EP | 0 441 831 B1 | * | 8/1991 | |
| FR | 2 353 779 | | 6/1976 | ........... F16K/17/00 |
| GB | 1155285 | | 6/1969 | |
| JP | 09119535 | | 5/1997 | |
| JP | 11082291 | | 3/1999 | |

\* cited by examiner

Primary Examiner—Ramesh Krishnamurthy
(74) Attorney, Agent, or Firm—Cohen, Pontani, Lieberman & Pavane

(57) ABSTRACT

A valve for a fuel delivery unit has a counterholder pressed into a housing. A spring is supported on the counterholder and is intended for prestressing a closing part against a valve seat. The valve according to the invention can be fitted in a particularly simple manner.

2 Claims, 3 Drawing Sheets

VALVE FOR A FUEL DELIVERY UNIT

CROSS-REFERENCE TO RELATED APPLICATIONS

This application is a Divisional of U.S. patent application Ser. No. 09/885,199, filed Jun. 20, 2001, now U.S. Pat. No. 6,640,831 which claims priority from an application filed in Germany on Jun. 21, 2000, No. 100 30 609.9.

BACKGROUND OF THE INVENTION

1. Field of the Invention

The present invention relates to a pressure control valve for a fuel delivery unit having a housing having a valve seat, a closing part arranged in the housing and movable against the valve seat, and a spring which is supported on a counterholder connected to the housing for prestressing the closing part. The present invention further relates to a ventilation valve for a fuel delivery unit having a housing with a valve seat, a closing part arranged in the housing and movable against the valve seat, and a spring for prestressing the closing part, the spring having smaller dimensions than the closing part.

2. Description of the Related Art

Valves having closing parts prestressed by springs are frequently used in known fuel delivery units as pressure control valves or as ventilation valves and are known in practice. The housings of these valves are designed as cup-shaped deformations in a housing part closing the delivery unit. The housing of the known pressure control valve is made of a tubular design for accommodating the closing part, which is designed as a ball, and the spring. After the closing part and the spring are installed, the housing is closed by a counterholder which is designed as a cap. The counterholder has slots through which fuel flows and centering elements for centering the spring and latching elements in the housing. In the known ventilation valve, only the spring is located within the housing. The valve seat is arranged on an outer side of the end of the housing which lies opposite the counterholder. Components located below the housing part of the delivery unit restrict the travel of the closing part. During installation, the travel of the closing part is restricted by a clamp.

A problem with the known valves is that they are complicated to fit and have components which are cost-intensive to manufacture. For example, the counterholder which is designed as a cap and the clamp required for restricting the travel of the closing part are each very complicated components. Furthermore, the components of the known valve have to be fitted precisely in their intended orientations. This requirement for precise fit makes automatic installation of the valves difficult.

SUMMARY OF THE INVENTION

It is an object of the present invention to provide a valve for a fuel delivery that is cost-effective to produce and may be easily fitted.

The object of the present invention is met by a pressure control valve for a fuel delivery unit having a counterholder designed as a ball having a larger diameter than a closing part and a spring of the valve.

The counterholder is of particularly simple construction because of this design and may be manufactured cost-effectively and on a large scale. Furthermore, a spring is easily supported on the surface of the counterholder. Furthermore, the present invention obviates the requirement for centering means for centering the spring. During installation, the closing part which is likewise generally designed as a ball and the spring are inserted into the housing. The counterholder which is designed as a ball may then be automatically supplied and connected to the housing, thereby allowing the valve according to the present invention to be fitted in a particularly simple manner.

According to a further embodiment of the present invention, the counterholder may be reliably held in its envisaged position if it is pressed into the housing.

The installation of the counterholder may be further simplified if the housing includes a latching means for supporting the counterholder.

The counterholder may be connected in a simple manner if the housing has introducing slopes for the counterholder or if the optional latching means have introducing slopes at the ends of the latching means pointing away from the housing.

The housing or the latching means reliably holds the counterholder in its envisaged position after installation if regions of the housing or latching means which face the counterholder are pan-shaped.

The counterholder which is designed as a ball may be penetrated by a plurality of channels in a star shape to enable fuel to flow through when the valve is opened. Alternatively, the construction of the counterholder may be further simplified by arranging openings in the housing between the closing part and the counterholder.

The object of the present invention is also met by a ventilation valve for a fuel delivery unit having latching means for gripping a closing part from behind. Furthermore, the latching means have a bearing region for the support of the closing part in a position in which the closing part is prestressed by a spring.

The ventilation valve according to this embodiment of the present invention does not require a clamp which is complicated to manufacture and to fit. The valve therefore includes a small number of components to be fitted. During installation of the valve according to the invention, the ball may simply be pressed into the housing behind the latching means after the insertion of the spring. The valve is then completely fitted. This embodiment of the present invention obviates the need for components which are adjacent to the housing part of the delivery unit to restrict the travel of the closing part. The housing part of the delivery unit and the completely fitted valve according to the present invention may also be designed in a cost-effective manner as a prefitted component.

According to a further embodiment of the present invention, the latching means are designed in a structurally particularly simple manner as a hook-shaped design.

The valve, according to the invention, is designed in a structurally particularly simple manner if the latching means have, on their side facing the closing part, guide edges for the closing part.

The number of components of the valve according to the present invention which are to be fitted is further reduced if the latching means are manufactured integrally with the housing. In the case of the pressure control valve and the ventilation valve, this design of the present invention reduces the manufacturing costs.

The counterholder or the closing part may be brought in a simple manner into its envisaged position if the housing has introducing slopes for the counterholder or the closing part or the ends of the latching means pointing away from the housing have introducing slopes for the counterholder or the closing part.

According to a further embodiment of the present invention, the installation of the counterholder or of the closing part behind the latching means is further simplified by distributing a plurality of latching means over the circumference of the closing part or of the counterholder. The gaps between the latching means allow fuel or air to flow between the latching means such that openings are not required in the housing.

Covers may be arranged between the latching means at a short distance therefrom for preventing fuel which is sloshing around in a fuel tank on which the valve from affecting the movement of the closing part.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
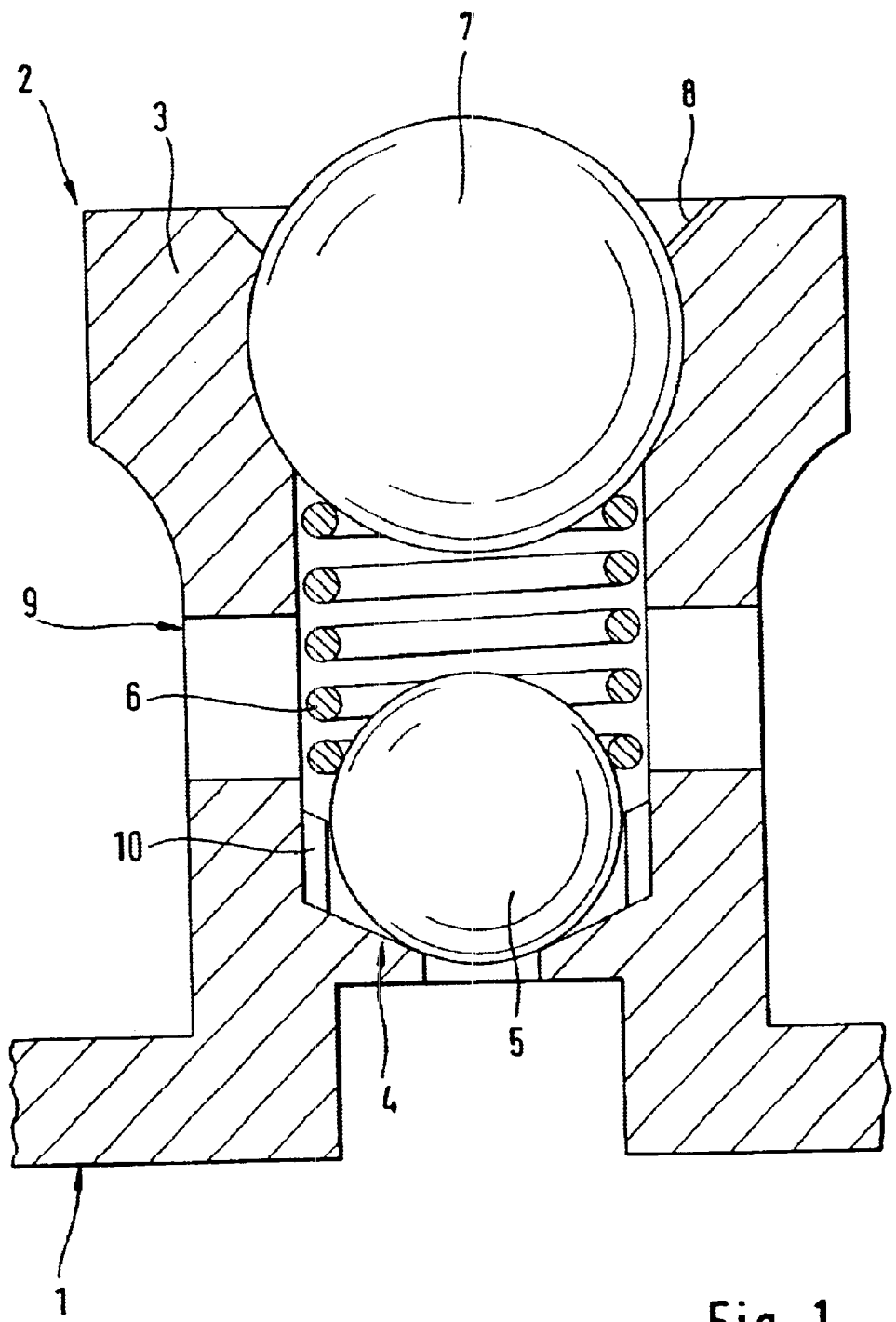
FIG. 1 is a sectional view of a valve according to a first embodiment of the present invention.

FIG. 1 shows a housing part 1 of a fuel delivery unit having a valve 2 arranged thereon and which is insertable into a fuel tank of a motor vehicle. The valve 2 is a pressure control valve and has a valve housing 3. The valve 2 further includes a valve seat 4 and a closing part 5 which is prestressed against the valve seat 4. A spring 6 is arranged within the valve housing 3 for prestressing the closing part 5 against the valve seat 4. The spring is supported on a support comprising a counterholder 7 which is designed as a ball and is pressed into the valve housing 3. The diameter of the counterholder 7 is larger than the diameter of the spring 6 and the diameter of the closing part 5 such that no part of the spring 6 or the closing part 5 projects beyond an area defined by a circumference of the counterholder 7. During installation of the valve 2, the closing part 5 is inserted together with the spring 6 in the valve housing 3. The counterholder 7 is then pressed into the valve housing 3. To simplify the pressing-in, a peripheral introducing slope 8 may be arranged at the free end of the valve housing 3. Openings 9 are arranged in the valve housing 3 between the counterholder 7 and the closing part 5. Furthermore, guide webs 10 for guiding the closing part 5 may be arranged laterally in the valve housing 3. During operation, the closing part 5 lifts off of the valve seat 4 counter to the force of the spring 6 when the pressure below the closing part 5 exceeds a designated value. Fuel is permitted to flow through the valve 2 when the closing part 5 lifts off of the valve seat 4. Instead of openings 9, the counterholder 7 may have openings therethrough for allowing a flow of the fuel.

Figure 1A:
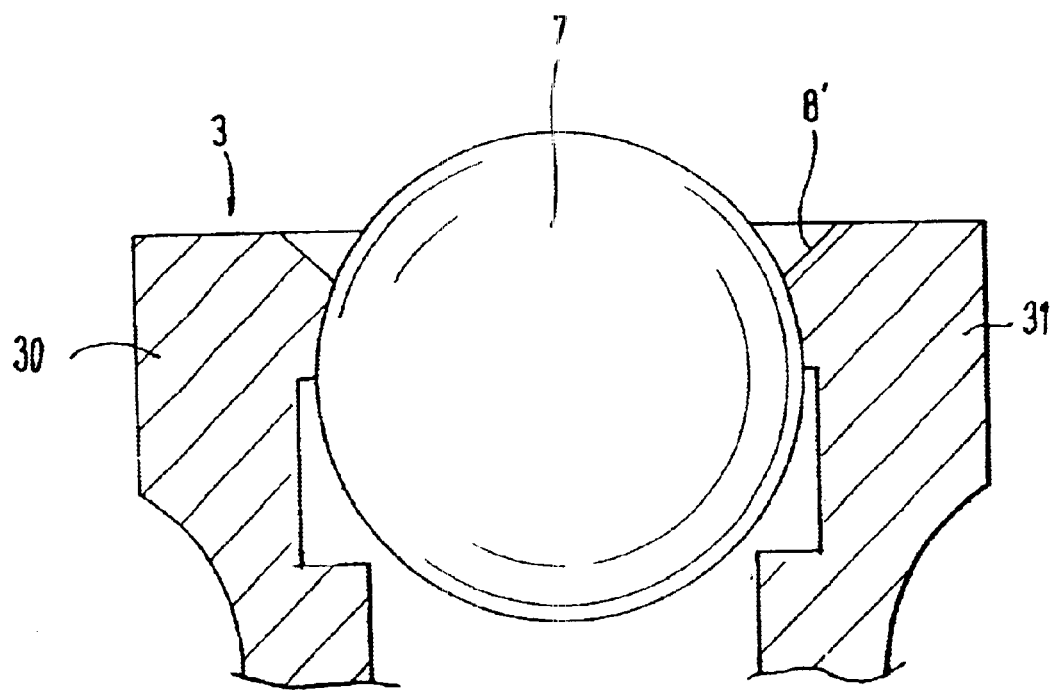
FIG. 1a is a partial sectional view of a valve according to another embodiment of the present invention.

FIG. 1a shows an alternative embodiment in which the valve housing 3 has a plurality of latching means 30, 31 arranged at a short distance from one another in the region of the counterholder 7 for holding the counterholder in the valve housing 3. Fuel is thereby permitted to flow between the latching means when the valve 2 is open. The latching means 30, 31 are pan-shaped in regions where they contact the counterholder.

Figure 2:
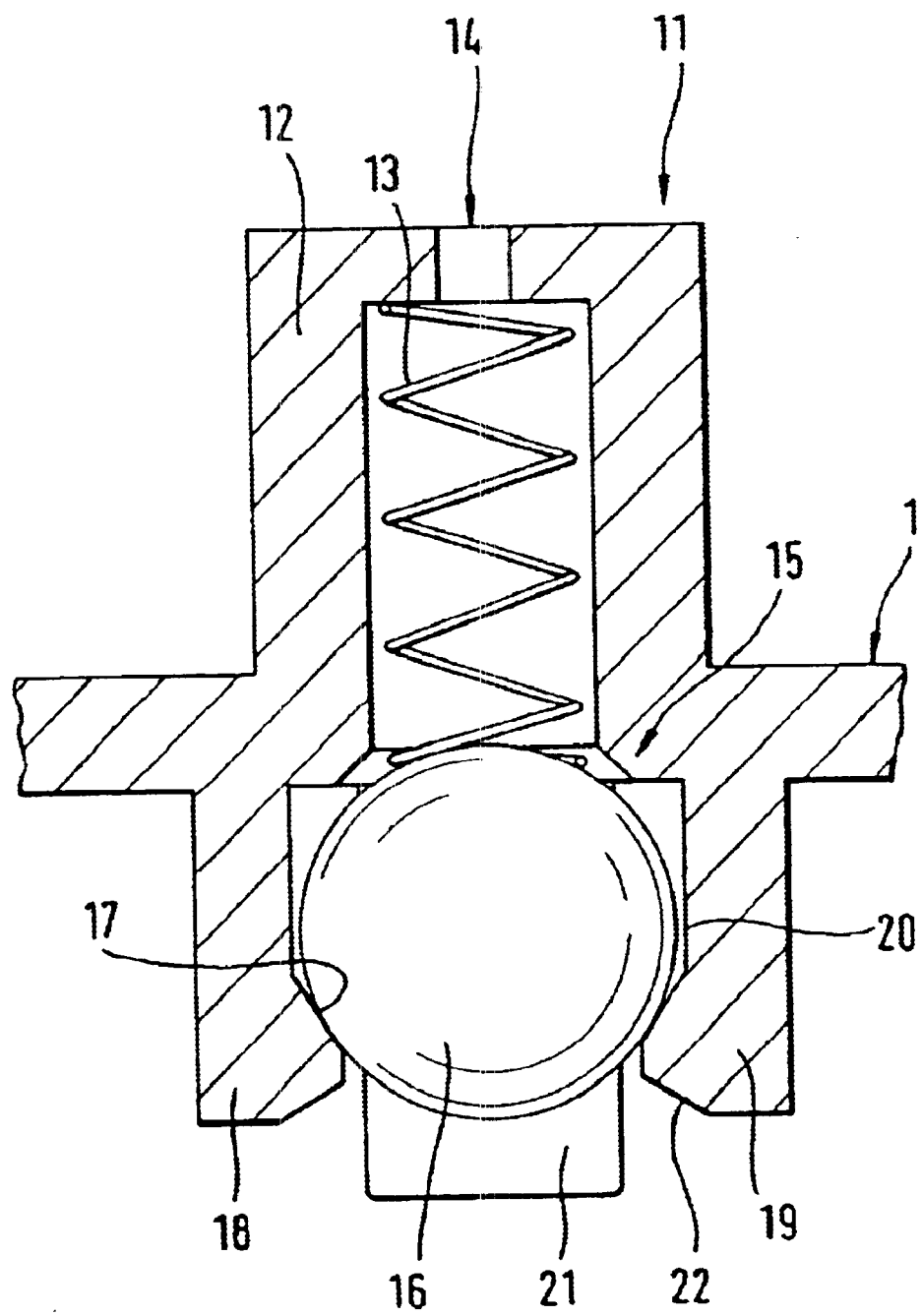
FIG. 2 is a sectional view of a valve according to yet another embodiment of the present invention.

FIG. 2 shows the housing part 1 of the fuel delivery unit with a valve 11 which is designed as a ventilation valve. The valve 11 has a housing 12 with a spring 13 arranged in it. The housing 12 has a cup-shaped design with a ventilation opening 14 arranged at one end and a valve seat 15 arranged at the other end. The spring 13 is supported at the bottom end of the cup-shaped design and urges a closing part 16 away from the valve seat 15 against a bearing region 17 arranged on latching means 18, 19. The closing part 16 is arranged so that the latching means 18, 19 grip the closing part 16 from behind. The latching means 18, 19 have guide edges 20 in their regions facing the closing part 16. FIG. 2 further shows that covers 21 are arranged between the latching means 18, 19. In the open position which is shown, air can flow through the ventilation opening 14 in the housing 12 past the closing part 16 between the covers 21 and the latching means 18, 19. When a filling level of fuel reaches the closing part 16, the latter is pressed against the valve seat 15 and closes the valve 11. Accordingly, the closing part 16 has a lower density than the fuel. During installation of the valve 11, the spring 13 is inserted into the housing 12 and the closing part 16 is then pressed behind the latching means 18, 19. To simplify the installation of the closing part 16, the latching means 18, 19 have introducing slopes 22.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A valve for a fuel delivery unit, comprising:
   a housing having a valve seat;
   a closing part movable against said valve seat;
   a spring arranged in said housing for prestressing said closing part relative to said valve seat, said spring having smaller dimensions than said closing part;
   a plurality of latching means arranged on said housing around a circumference of said closing part for gripping said closing part from behind, said latching means having a bearing region, wherein said spring is arranged for prestressing said closing part against said bearing region; and
   a cover arranged between each adjacent pair of said plural latching means at a distance therefrom.

2. The valve of claim 1, wherein said housing is formed as one piece which defines said valve seat and said plurality of latching means.

* * * * *